United States Patent
Itoh et al.

(10) Patent No.: US 8,422,121 B2
(45) Date of Patent: Apr. 16, 2013

(54) OPTICAL TRANSMISSION APPARATUS AND OPTICAL SIGNAL LEVEL CHECKING METHOD

(75) Inventors: Hiroyuki Itoh, Kawasaki (JP); Takuji Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 12/815,722

(22) Filed: Jun. 15, 2010

(65) Prior Publication Data

US 2010/0315702 A1    Dec. 16, 2010

(30) Foreign Application Priority Data

Jun. 16, 2009   (JP) .................... 2009-143060

(51) Int. Cl.
*H04B 10/17*   (2006.01)
*H04B 10/08*   (2006.01)

(52) U.S. Cl.
USPC ............ 359/337.13; 398/37; 398/34; 398/45; 398/177

(58) Field of Classification Search ............. 359/337.13; 398/34, 37, 45, 177
See application file for complete search history.

(56) References Cited

U.S. PATENT DOCUMENTS

| | | | | |
|---|---|---|---|---|
| 5,978,113 | A * | 11/1999 | Kight | 398/1 |
| 6,351,323 | B1 * | 2/2002 | Onaka et al. | 398/84 |
| 6,661,947 | B2 * | 12/2003 | Shirai | 385/24 |
| 6,879,434 | B2 * | 4/2005 | Aoki et al. | 359/334 |
| 7,110,668 | B2 * | 9/2006 | Gerstel et al. | 398/5 |
| 7,336,901 | B1 * | 2/2008 | Soulliere | 398/94 |
| 7,715,715 | B2 * | 5/2010 | Gerstel et al. | 398/59 |
| 2002/0101633 | A1 * | 8/2002 | Onaka et al. | 359/119 |
| 2012/0170938 | A1 * | 7/2012 | Evans et al. | 398/91 |

FOREIGN PATENT DOCUMENTS

JP   2004-23437   1/2004

* cited by examiner

*Primary Examiner* — Mark Hellner
*Assistant Examiner* — Ari M Diacou
(74) *Attorney, Agent, or Firm* — Staas & Halsey LLP

(57) ABSTRACT

An optical transmission node including an optical preamplifier to amplify input light and an optical postamplifier to amplify light output from the optical preamplifier, includes the optical postamplifier configured to generate amplified spontaneous emission light without signals input, the optical preamplifier configured to amplify the amplified spontaneous emission light from the optical postamplifier, a loopback switch configured to discouple a path of the light output from the optical preamplifier to the optical postamplifier, and couple a path of the light output from the optical postamplifier to the optical preamplifier.

9 Claims, 13 Drawing Sheets

OPTICAL TRANSMISSION APPARATUS AND OPTICAL SIGNAL LEVEL CHECKING METHOD

CROSS-REFERENCE TO RELATED APPLICATIONS

This application is based upon and claims the benefit of priority of the prior Japanese Patent Application No. 2009-143060, filed on Jun. 16, 2009, the entire contents of which are incorporated herein by reference.

FIELD

The embodiments discussed herein are related to an optical transmission apparatus that conducts optical transmission, as well as an optical signal level checking method.

BACKGROUND

When starting up an optical transmission apparatus and node for the first time, work is carried out to configure individual plugin units and check device operation.

For example, in an optical amp, gain is configured by utilizing amplified spontaneous emission (ASE). This involves causing ASE to be produced from an optical amp at a node positioned upstream along the optical fiber line, and then causing the ASE to be input into an optical amp at a node positioned downstream. Subsequently, the gain is configured such that the optical output level from the downstream amp reaches a desired level.

Related technology for starting up an apparatus by utilizing ASE is proposed in, for example, Japanese Unexamined Patent Application Publication No. 2004-23437.

Besides configuring the gain in the optical amp, another important step when first starting up a system that conducts optical transmission using wavelength-division multiplexing (WDM) is checking whether or not optical signals are being output at normal levels after wavelength separation in the apparatus. However, in the related art, it has been difficult to precisely check the normality of optical signal levels after wavelength separation utilizing ASE.

FIG. 11 illustrates a WDM transmission apparatus. FIG. 11 illustrates the portion of a WDM transmission apparatus 5 configured to receive and separate a WDM optical signal multiplexed with light having a plurality of respectively different wavelengths. The WDM transmission apparatus 5 includes the following plugin units: an optical preamp unit 51, and a wavelength separation unit 52. The optical preamp unit 51 includes a preamp 51a and a coupler 51b. Meanwhile, the wavelength separation unit 52 includes a DMUX 52a, couplers 52b-1 to 52b-n, and photodiodes (PD) 52c-1 to 52c-n.

The preamp 51a amplifies and outputs a received WDM signal flowing in from upstream along an optical fiber line F. The amplified WDM optical signal is split into two parts by the coupler 51b, with one part being provided to a post-processor, and the other part being provided to the wavelength separation unit 52.

The DMUX 52a separates the received WDM optical signal into n wavelengths. Each of the couplers 52b-1 to 52b-n then splits the optical signal for one of the wavelengths into two parts, with one part being provided to one of the PDs 52c-1 to 52c-n, and the other part being directed to a tributary and dropped. Each of the PDs 52c-1 to 52c-n generates an electrical signal by O/E converting the received optical signal for one of the wavelengths. The generated electrical signals are then provided to a predetermined processor.

When starting up the WDM transmission apparatus 5 herein for the first time, the configuring and checking work is conducted individually for the respective plugin units (i.e., the optical preamp unit 51 and the wavelength separation unit 52).

Work performed with respect to the optical preamp unit 51 when starting up the apparatus may involve, for example, causing ASE provided from an upstream node and flowing along the optical fiber line F to be input into the preamp 51a, and configuring the gain in the preamp 51a.

Meanwhile, work performed with respect to the wavelength separation unit 52 when starting up the apparatus may involve, for example, checking whether or not the optical signals are being output (or dropped) at normal levels after the wavelength separation in the DMUX 52a. In this case, it can be checked whether or not the optical signals at the respective wavelengths are at normal levels by examining the electrical signal levels after O/E conversion in each of the PDs 52c-1 to 52c-n.

In order to precisely check the normality of the optical signal levels after wavelength separation, it is preferable for the optical signal input into the DMUX 52a to have an optical power that is close to the power of a WDM optical signal received during normal operation. In other words, it is preferable for the optical signal input into the DMUX 52a to have an optical power in the WDM optical signal wavelength band that is nearly identical to the optical power when receiving a WDM optical signal during normal operation.

When inputting ASE into the wavelength separation unit 52, the ASE provided from an upstream node travels along the optical fiber line F, and thus its optical power is extremely low upon arrival. For this reason, in order to make the optical power close to the optical power when receiving a WDM optical signal during normal operation, the low-power ASE is amplified to high-power ASE in the preamp 51a.

However, if the gain is increased to raise the low-power ASE flowing in along the optical fiber line F to an optical power nearly equal to the optical power when receiving a WDM optical signal during normal operation, the shape of the wavelength profile becomes significantly sloped.

FIG. 12 illustrates such sloping being produced in the shape of the wavelength profile. In FIG. 12, the horizontal axis expresses the optical power (in dBm), while the vertical axis expresses the wavelength (in nm). If a standard erbium-doped fiber amplifier (EDFA) is used as the optical amp, then as the gain of the EDFA is raised, population inversion also rises. It has been established that in such a state with high population inversion, the optical power with respect to the wavelength slope down and to the right in the region corresponding to the WDM optical signal wavelength band, such as near the range from 1530 nm to 1570 nm. (In contrast, if the gain is lowered to create a low population inversion state, then the optical power with respect to the wavelength slope up and to the right.) Meanwhile, it has been established that flatness is obtained when the population inversion is kept to approximately 70%.

FIG. 13 illustrates a WDM transmission apparatus. FIG. 13 illustrates the outputting of ASE produced by a sloped wavelength profile. In the wavelength profile pr1 at the input stage of the preamp 51a, the ASE 2 provided from an upstream node has a flat optical power in the WDM optical signal wavelength band (i.e., the optical power is uniform at those wavelengths), but the optical power is also very low overall.

Given such ASE 2, if the gain in the preamp 51a is then increased to amplify the ASE 2 to an optical power close to the optical power when receiving a WDM optical signal during normal operation, the wavelength profile of the ASE 2a output from the preamp 51a loses much of its flatness. In other words, as illustrated in the wavelength profile pr2, the resulting ASE is high-power, but the portion that was flat in the wavelength profile pr1 now slopes down and to the right.

If the ASE 2a having such a wavelength profile pr2 is input into the DMUX 52a, then even if the optical signal levels after wavelength separation are monitored, differences in the optical levels at respective wavelengths are already produced before wavelength separation. For this reason, strict checking of the normality of the optical signal levels after wavelength separation becomes problematic.

Meanwhile, it is also conceivable to check the normality of optical signal levels after wavelength separation by forgoing use of the ASE 2 provided from the upstream node, putting the preamp 51a into an input-less state, and inputting ASE produced by the preamp 51a itself into the DMUX 52a.

In this case, it is still preferable for the ASE input into the DMUX 52a to have an optical power close to the optical power when receiving a WDM optical signal during normal operation. Thus, the preamp 51a amplifies the self-produced ASE to a predetermined level before output.

However, outputting ASE with an optical power close to the incoming level of a WDM optical signal during normal operation from a preamp in an input-less state is dependent upon the amplification performance of the preamp 51a, and thus imposes restrictions on the manufacturing specifications of the preamp 51a itself. This method is not readily applicable to an arbitrary preamp.

Even if it were hypothetically possible to increase gain and output ASE that has been amplified to a predetermined level from the preamp 51a in an input-less state without imposing restrictions on the manufacturing specifications of the optical preamp unit 51a itself, a large gain still be set in the preamp 51a, and thus the ASE output from the preamp 51a have a wavelength profile that has lost some of its flatness, like the above wavelength profile pr2. Consequently, it is still difficult to strictly check the normality of optical signal levels after wavelength separation, even with the method of producing ASE from the preamp 51a itself.

As described above, in a WDM transmission apparatus of the related art, it is difficult to produce ASE having a flat and high-output wavelength profile, and thus it is also difficult to precisely check the normality of optical signal levels after wavelength separation.

Being devised in light of such points, one object of the preprovided invention is to provide an optical transmission apparatus and an optical signal level checking method that enable the normal operation of apparatus functions to be checked with high precision by utilizing ASE.

SUMMARY

An optical transmission node including an optical preamplifier to amplify input light and an optical postamplifier to amplify light output from the optical preamplifier, includes the optical postamplifier configured to generate amplified spontaneous emission light without signals input, the optical preamplifier configured to amplify the amplified spontaneous emission light from the optical postamplifier, a loopback switch configured to discouple a path of the light output from the optical preamplifier to the optical postamplifier, and couple a path of the light output from the optical postamplifier to the optical preamplifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
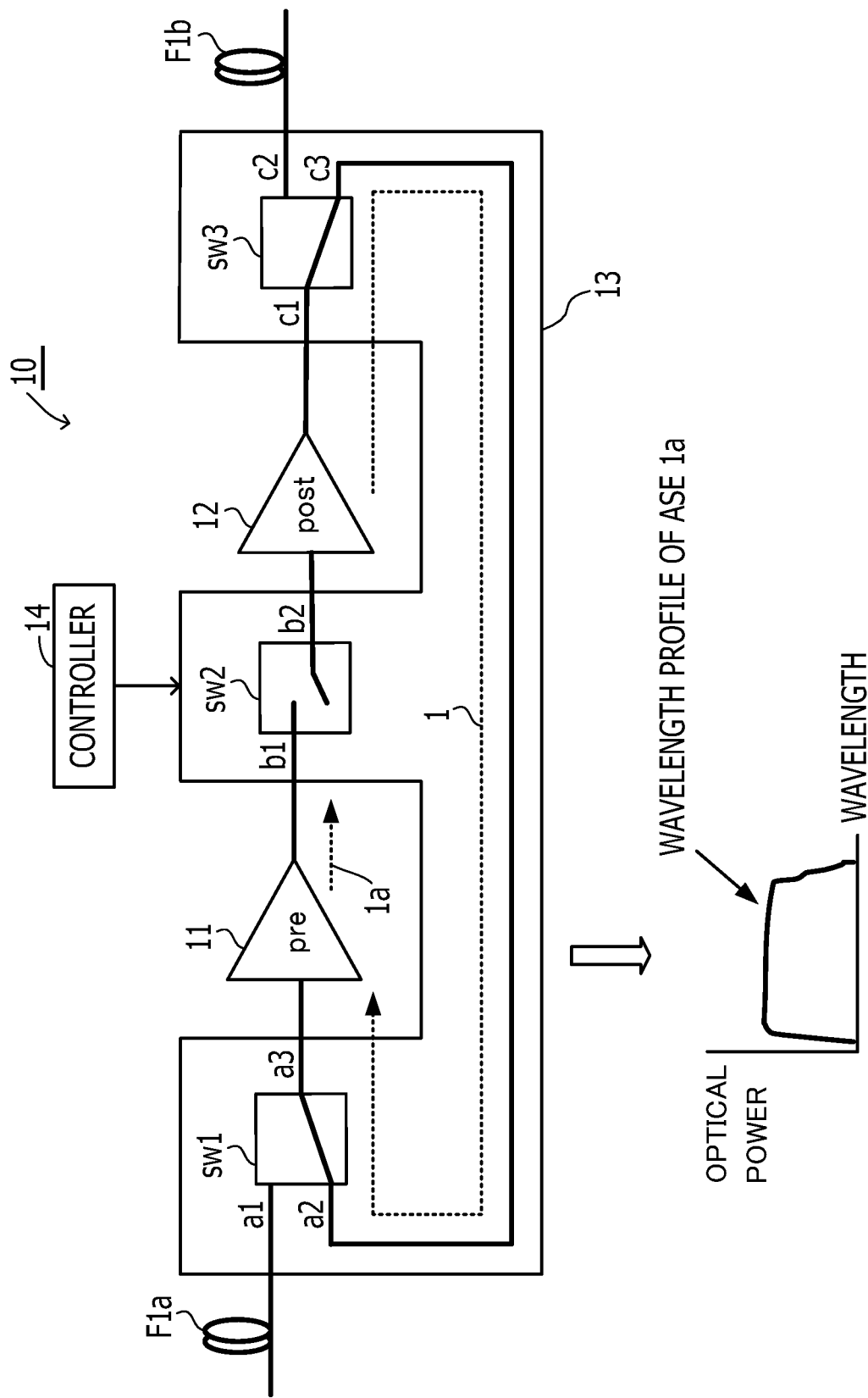
FIG. 1 illustrates an exemplary configuration of an optical transmission apparatus.

Hereinafter, embodiments will be described with reference to the accompanying drawings. FIG. 1 illustrates an exemplary configuration of an optical transmission apparatus. The optical transmission apparatus 10 transmits optical signals, and is provided with a preamp (i.e., an optical preamplifier) 11, a postamp (i.e., an optical postamplifier) 12, a loopback switch 13, and a controller 14.

The loopback switch 13 includes a switch sw1 (a first switch), a switch sw2 (a second switch), and a switch sw3 (a third switch). The switch sw1 includes input terminals a1 and a2, as well as an output terminal a3. The switch sw2 includes an input terminal b1 and an output terminal b2. The switch sw3 includes an input terminal c1, as well as output terminals c2 and c3.

Herein, the switch sw1 selects either an optical signal provided from an upstream node via the optical fiber line F1a, or the light output from the postamp 12, and inputs the selection into the preamp 11. The switch sw2 selects the light output from the preamp 11, and either inputs the output light into the postamp 12, or blocks the light. The switch sw3 selects the light output from the postamp 12, and provides the output light to either a downstream node via an optical fiber line F1b, or to the preamp 11.

The switches sw1 to sw3 are coupled as follows. The input terminal a1 of the switch sw1 is coupled to the optical fiber line F1a, while the output terminal a3 of the switch sw1 is coupled to the input port of the preamp 11. The input terminal b1 of the switch sw2 is coupled to the output port of the preamp 11, while the output terminal b2 of the switch sw2 is coupled to the input port of the postamp 12. The input terminal c1 of the switch sw3 is coupled to the output port of the postamp 12, while the output terminal c2 of the switch sw3 is coupled to the optical fiber line F1b. The output terminal c3 of the switch sw3 is coupled to the input terminal a2 of the switch sw1.

Herein, the preamp 11 amplifies input light. The light output from the preamp 11 is then input into the postamp 12 and amplified. The loopback switch 13 switches the switches sw1 to sw3 to perform loopback processing, wherein light output from the postamp 12 is looped back and input into the preamp 11 (the switching operation will be described later).

The controller 14 issues loopback processing instructions (i.e., switching instructions) to the loopback switch 13. Herein, the controller 14 also includes controls for other elements of the optical transmission apparatus 10, and conducts overall control of the apparatus itself. Furthermore, the user interface functions are also included, whereby the controller 14 couples to a maintenance terminal and performs actions such as issuing notifications regarding the operational status of the apparatus to the maintenance terminal, and configuring settings (such as switching settings) from data provided externally via the maintenance terminal.

During loopback processing, the loopback switch 13 sets the switches such that the switch sw3 provides the light output from the postamp 12 to the preamp 11, the switch sw1 inputs the light output from the postamp 12 into the preamp 11, and the switch sw2 blocks the light output from the preamp 11 from being input into the postamp 12.

By performing such switching control, ASE 1 (i.e., light by amplified spontaneous emission) from the postamp 12 is produced, and subsequently input into the preamp 11 and amplified. ASE 1a is then output from the preamp 11, the ASE 1a having wavelength characteristics (i.e., a wavelength profile) such that the optical power is both high-output and flat (i.e., uniform) for all wavelengths in the wavelength band of optical signals transmitted by the optical transmission apparatus 10.

Figure 2:
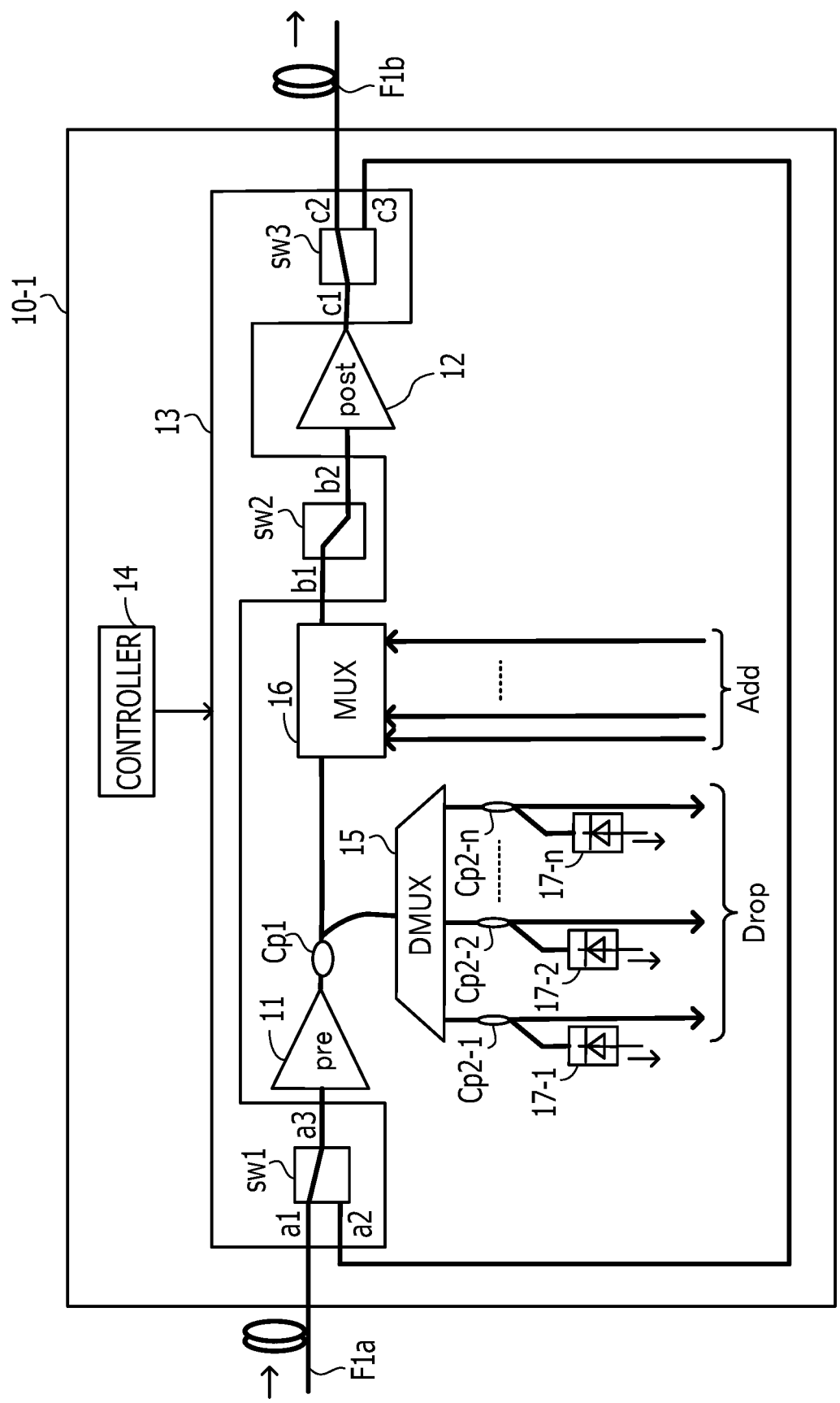
FIG. 2 illustrates an exemplary configuration of an optical transmission apparatus.

The case of applying the optical transmission apparatus 10 to an apparatus conducting WDM transmission will now be described. FIG. 2 illustrates an exemplary configuration of an optical transmission apparatus. The optical transmission apparatus 10-1 transmits WDM optical signals, includes optical add-drop multiplexing (OADM) functions, and is provided with a preamp 11, a postamp 12, a loopback switch 13, a controller 14, a DMUX (i.e., a wavelength demultiplexer) 15, a MUX (i.e., a wavelength multiplexer) 16, PDs 17-1 to 17-n, a coupler Cp1, and couplers Cp2-1 to Cp2-n.

The loopback switch 13 includes the switches sw1 to sw3 described above. The switches sw1 to sw3 are coupled as follows. The input terminal a1 of the switch sw1 is coupled to the optical fiber line F1a, while the output terminal a3 of the switch sw1 is coupled to the input port of the preamp 11. The input terminal b1 of the switch sw2 is coupled to the output port of the MUX 16, while the output terminal b2 of the switch sw2 is coupled to the input port of the postamp 12. The input terminal c1 of the switch sw3 is coupled to the output port of the postamp 12, while the output terminal c2 of the switch sw3 is coupled to the optical fiber line F1b. The output terminal c3 of the switch sw3 is coupled to the input terminal a2 of the switch sw1.

Normal operation will now be described on the basis of FIG. 2. During normal operation, switching control is conducted as follows. The switch sw1 is switched such that the input terminal a1 is coupled to the output terminal a3, and a WDM optical signal flowing in along the optical fiber line F1a is input into the preamp 11.

The switch sw2 is switched such that the input terminal b1 is coupled to the output terminal b2, and light output from the preamp 11 is input into the postamp 12. The switch sw3 is switched such that the input terminal c1 is coupled to the output terminal c2, and light output from the postamp 12 is provided via the optical fiber line F1b. The switching control at this point is automatically set on the basis of switching instructions from the controller 14.

A WDM optical signal flowing in from upstream along the optical fiber line F1a is input into the preamp 11. The preamp 11 amplifies and outputs the WDM optical signal. The coupler Cp1 splits the amplified WDM optical signal into two parts, with one part being provided to the MUX 16, and the other part being provided to the DMUX 15.

The DMUX 15 separates the received WDM optical signal into n wavelengths, and outputs the results. Each of the couplers Cp2-1 to Cp2-n then splits the optical signal for one of the wavelengths into two parts, with one part being provided to one of the PDs 17-1 to 17-n, and the other part being directed to a tributary and dropped. Each of the PDs 17-1 to 17-n generates an electrical signal by O/E converting the received optical signal for one of the wavelengths. The generated electrical signals are then provided to a predetermined processor.

The MUX 16 uses wavelength-division multiplexing to multiplex the received WDM optical signal with added optical signals, thereby generating and outputting a new WDM optical signal. The postamp 12 amplifies the WDM optical signal output from the MUX 16, and provides the result downstream via the optical fiber line F1b.

Figure 3:
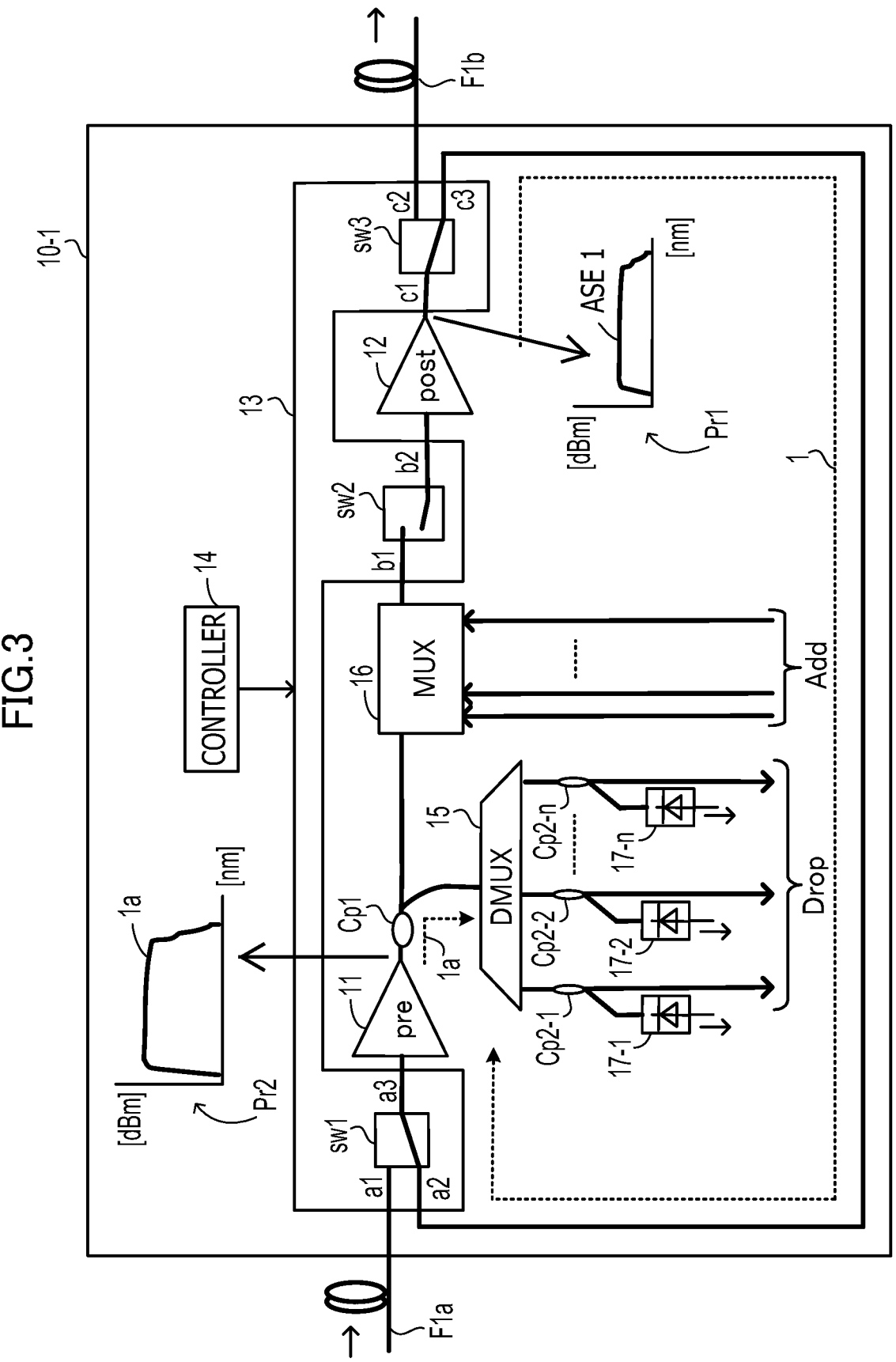
FIG. 3 illustrates an exemplary configuration of an optical transmission apparatus.

Operation during the loopback processing conducted at apparatus startup, for example, will now be described on the basis of FIG. 3. FIG. 3 illustrates an exemplary configuration of the optical transmission apparatus 10-1. During loopback processing, switching control is conducted as follows. The switch sw1 is switched such that the input terminal a2 is coupled to the output terminal a3, and light output from the postamp 12 is input into the preamp 11.

The switch sw2 is switched such that the input terminal b1 and the output terminal b2 are discoupled, and light output from the preamp 11 is blocked from being input into the postamp 12. The switch sw3 is switched such that the input terminal c1 is coupled to the output terminal c3, and light output from the postamp 12 is provided to the preamp 11. The switching control at this point is automatically set on the basis of switching instructions from the controller 14.

The postamp 12 enters an input-less state, and produces ASE 1 in the WDM optical signal wavelength band. The ASE 1 is looped back and input into the preamp 11. The preamp 11 amplifies the ASE 1 to an optical power close to the optical power when receiving a WDM optical signal during normal operation, and then outputs the amplified ASE 1a.

The DMUX 15 separates the received ASE 1a into n wavelengths, and outputs the results. Each of the couplers Cp2-1 to Cp2-n then splits the optical signal for one of the wavelengths into two parts, with one part being provided to one of the PDs 17-1 to 17-n. Each of the PDs 17-1 to 17-n generates an electrical signal by O/E converting the received optical signal for one of the wavelengths of the ASE 1a. The optical signal levels after wavelength separation are then checked from the levels of the electrical signals output from the PDs 17-1 to 17-n.

Herein, the ASE 1 produced by the postamp 12 has the wavelength profile Pr1, wherein the optical power is low and flat for all wavelengths in the WDM optical signal wavelength band. The ASE 1 is input into the preamp 11 and amplified to produce the ASE 1a. The ASE 1a output from the preamp 11 has the wavelength profile Pr2, wherein the optical power is high and flat for all wavelengths in the WDM optical signal wavelength band.

Figure 4:
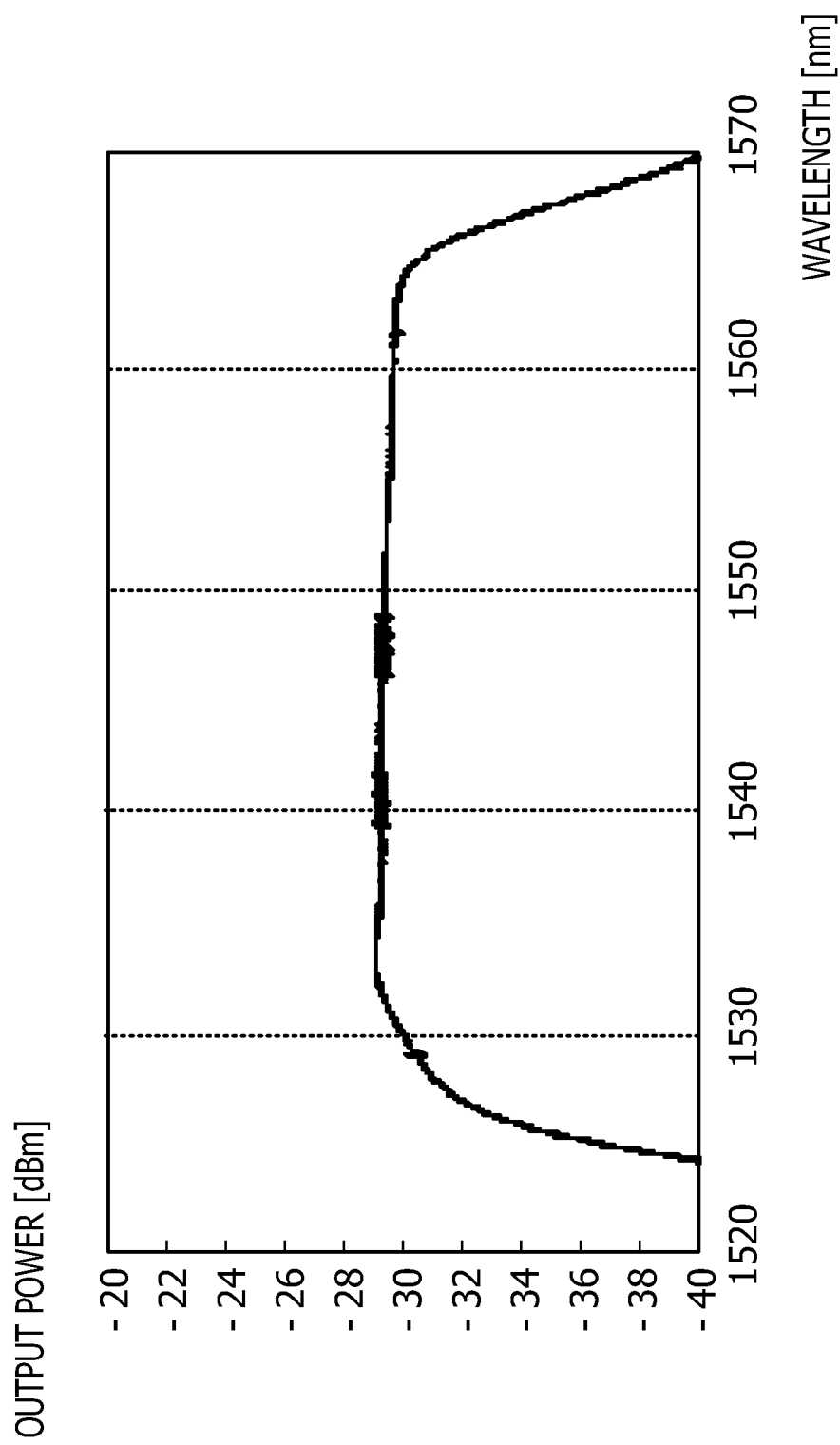
FIG. 4 illustrates an ASE spectrum.

FIG. 4 illustrates the spectrum of the ASE 1. Herein, a standard optical amp (EDFA) is used in the preamp 11 and the postamp 12. In FIG. 4, the horizontal axis expresses the optical power (in dBm), while the vertical axis expresses the wavelength (in nm). FIG. 4 illustrates the spectrum of the ASE 1 produced by the postamp 12 (i.e., the wavelength profile Pr1). in addition, operational parameters of the postamp 12 are set such that −6.4 dBm ASE is produced without input when the output is set to +0.6 dBm/ch.

If the output from the postamp 12 is set such that the primary signal power becomes +0.6 dBm per channel (i.e., per wavelength), then the spectrum of the postamp 12 when −6.4 dBm ASE is produced without input becomes like that illustrated in FIG. 4. As illustrated in FIG. 4, the resulting wavelength profile is low in optical power, but nearly flat in the WDM optical signal wavelength band.

Meanwhile, during normal operation, assume that a WDM optical signal multiplexed from a maximum of 40 channels is input into the preamp 11. Assume also that the operational parameters of the preamp 11 are set such that the output is +0.6 dBm/ch.

The optical power equivalent to a WDM optical signal multiplexed from 40 channels of optical signals thus becomes +16.6 dBm (=+0.6+10 log ((40 channels*1 mW)/1 mW)=+ 0.6+10 log 40). When causing ASE 1a equivalent to 40 channels to be produced from the preamp 11, the power of the ASE 1a thus becomes +16.6 dBm (herein calculated by taking each channel as a 1 mW input).

Consequently, in order to produce the optical power of a WDM optical signal multiplexed from 40 channels of optical signals by looping back the ASE 1 into the input of the preamp 11, the gain in the preamp 11 becomes 23 dB (=16.6−(−6.4)). A value equal to or in the vicinity of 23 dB corresponds to a gain that can be produced by an EDFA while keeping the population inversion to approximately 70%. A flat wavelength profile in the WDM optical signal wavelength band can thus be maintained with such a gain value. Furthermore, such a gain value is a typical gain included in the gain range usually covered by an EDFA, and thus a flat wavelength profile in the WDM optical signal wavelength band can be maintained.

The ASE 1a output from the preamp 11 is input into the DMUX 15, and wavelength separation is conducted. Therefore, ASE 1a is input into the DMUX 15 having an optical power that is both close to the optical power when receiving a WDM optical signal during normal operation, as well as being flat (i.e., uniform) over all wavelengths in the WDM optical signal wavelength band. Thus, since ASE considered equal to a WDM optical signal during normal operation can be input into the DMUX 15, it becomes possible to check the normality of the apparatus with high precision.

Figure 13:
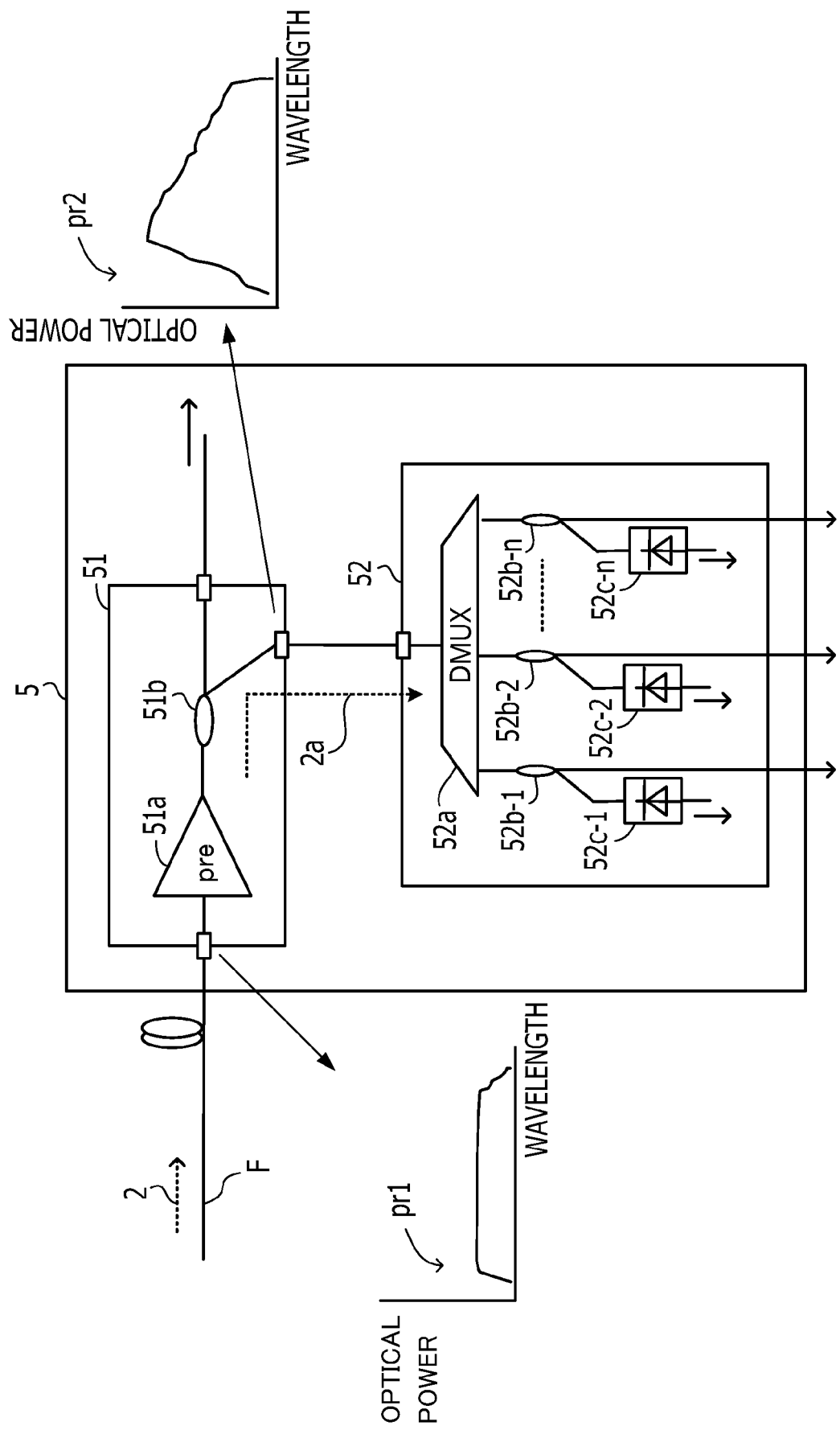
FIG. 13 illustrates a WDM transmission apparatus.

As described earlier with reference to FIG. 13, in the case of the related art, ASE 2 provided from an upstream node is input into the preamp. However, since this ASE 2 is transmitted along an optical fiber line, the optical power of the ASE 2 is lower than the optical power of the ASE 1 output from the postamp 12 in the optical transmission apparatus 10-1 by approximately 20 dB, for example.

Since the optical power of the ASE 2 has such an extremely faint level, using the preamp 11 to amplify the ASE 2 to an optical power equal to the optical power when receiving a WDM optical signal during normal operation involves a gain of over 43 dB (=23 dB+20 dB).

Figure 12:
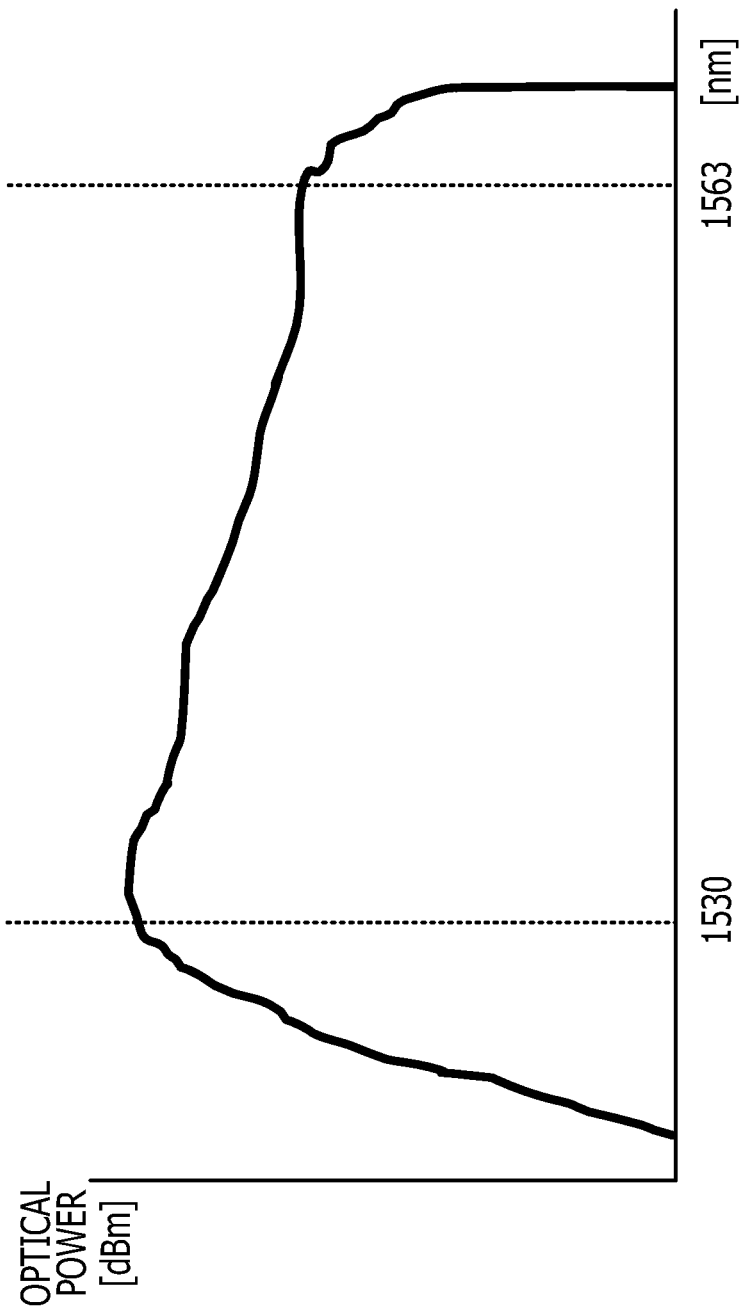
FIG. 12 illustrates how sloping is produced in the shape of a wavelength profile.

If the preamp 11 amplifies and outputs the ASE 2 at a high gain of over 43 dB, then as described earlier with reference to FIGS. 12 and 13, the output have the wavelength profile pr2, which slopes down and to the right with respect to wavelength. For this reason, such a configuration is unsuitable for use in checking the operation of component units such as the DMUX.

As described above, a preamp 11 and a postamp 12 provided in the same apparatus are configured such that ASE 1 produced by the postamp 12 is looped back into the preamp 11 and amplified, thereby producing ASE 1a having a high-output and flat wavelength profile.

By utilizing such ASE 1a, it becomes possible to check the operation of individual function units in the apparatus with high precision. For example, faults such as damage to the optical fiber between the preamp 11 and the DMUX 15 or damage to the DMUX 15 itself can be detected with good precision, thereby improving maintenance efficiency.

Herein, after conducting loopback processing and once measuring the level of each wavelength in the DMUX 15, the measured level values are stored as initial values in memory provided in the apparatus. In so doing, during normal operation after starting up the apparatus, it becomes possible to efficiently detect faults by comparing the initial values stored in memory to the wavelength levels during actual operation.

Figure 5:
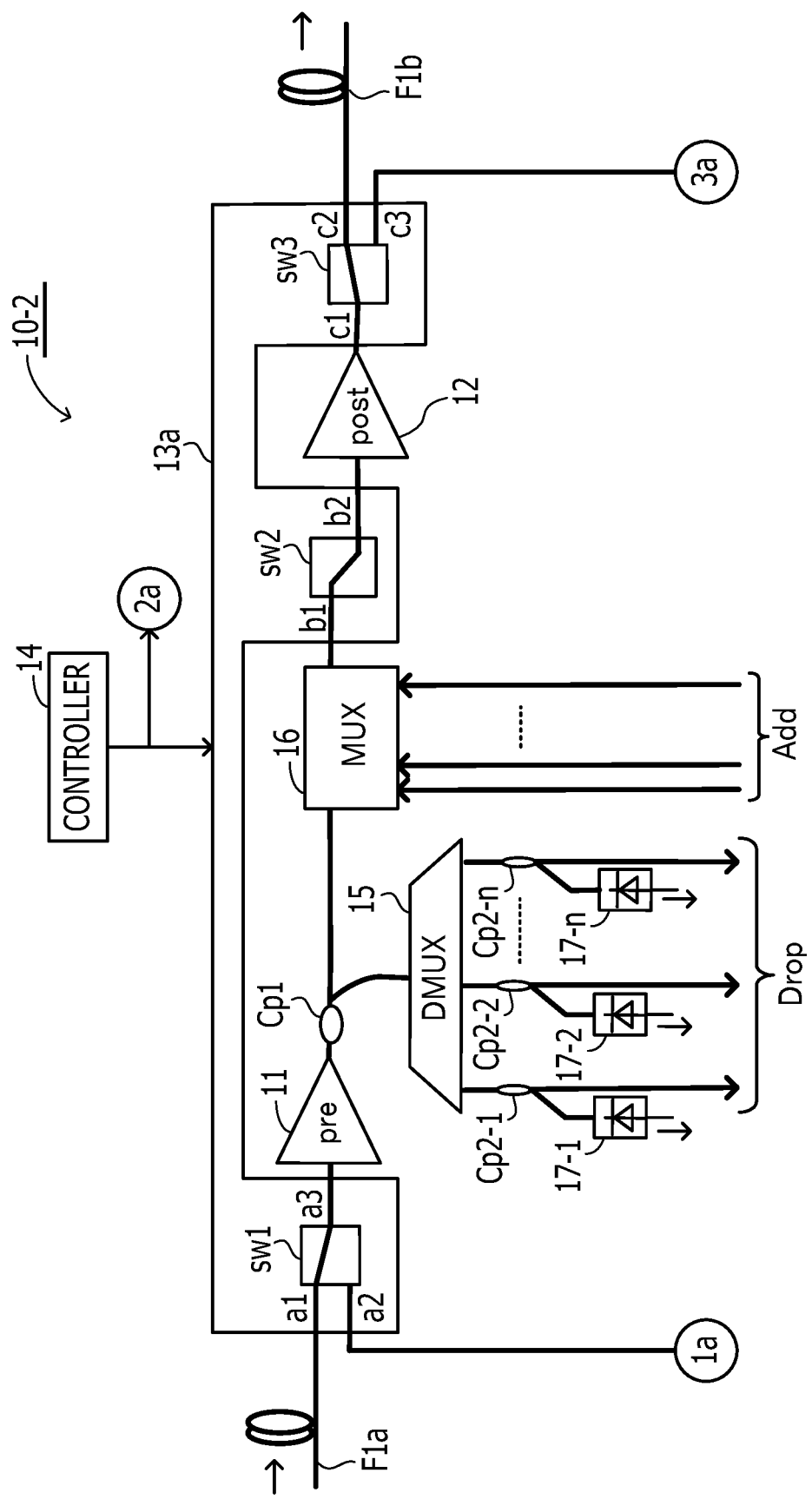
FIG. 5 illustrates an exemplary configuration of an optical transmission apparatus.
Figure 6:
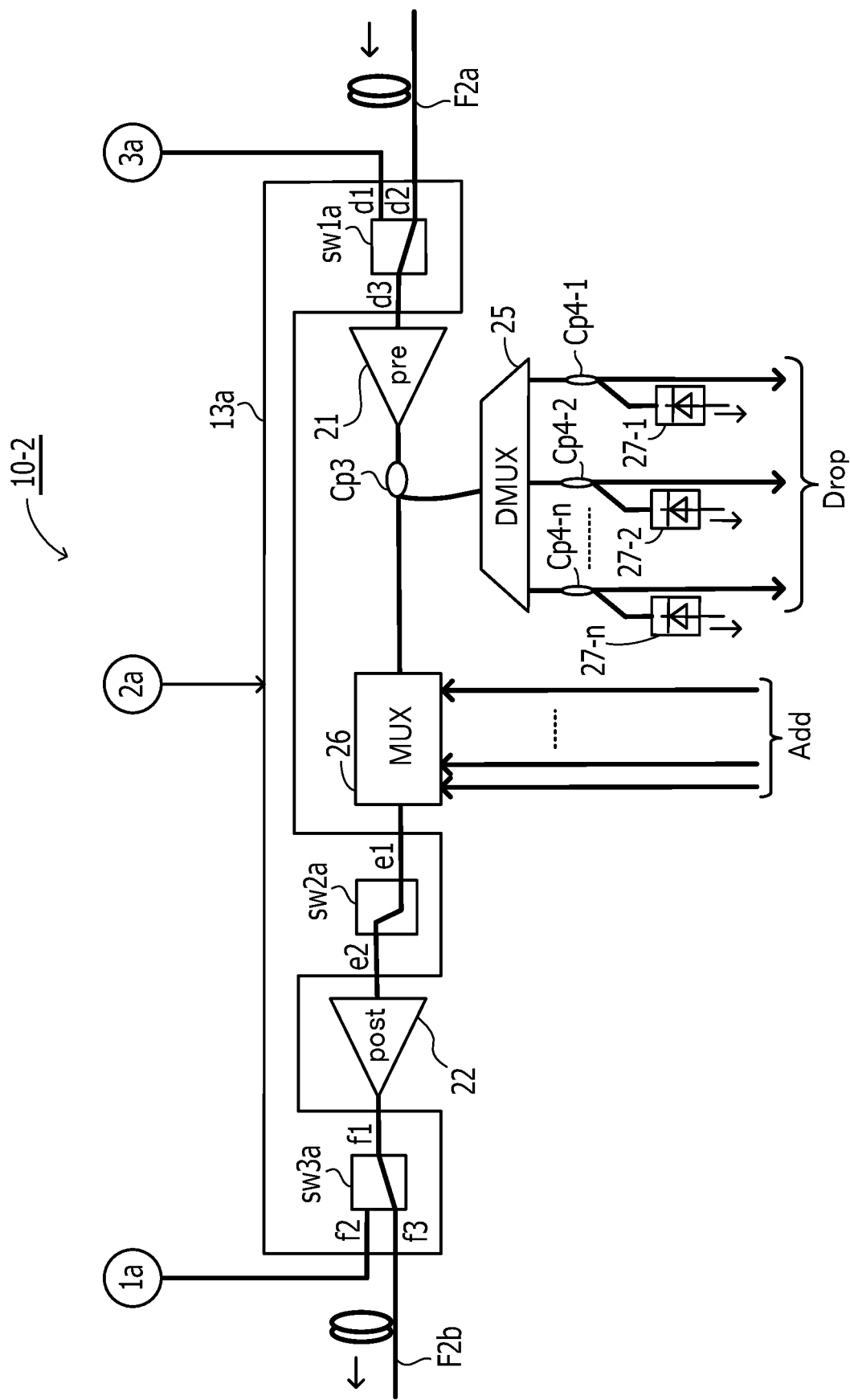
FIG. 6 illustrates an exemplary configuration of an optical transmission apparatus.

An optical transmission apparatus in accordance with another embodiment will now be described. FIGS. 5 and 6 illustrate exemplary configurations of an optical transmission apparatus. As illustrated in FIG. 5, the upstream-to-downstream optical transmission subsystem in the optical transmission apparatus 10-2 is provided with a preamp 11 (i.e., an upstream preamplifier), a postamp 12 (i.e., an upstream postamplifier), a DMUX 15 (i.e., an upstream wavelength demultiplexer), a MUX 16 (i.e., an upstream wavelength multiplexer), PDs 17-1 to 17-n, a coupler Cp1, and couplers Cp2-1 to Cp2-n.

As illustrated in FIG. 6, the downstream-to-upstream optical transmission subsystem in the optical transmission apparatus 10-2 is provided with a preamp 21 (i.e., a downstream preamplifier), a postamp 22 (i.e., a downstream postamplifier), a DMUX 25 (i.e., a downstream wavelength demultiplexer), a MUX 26 (i.e., a downstream wavelength multiplexer), PDs 27-1 to 27-n, a coupler Cp3, and couplers Cp4-1 to Cp4-n.

In addition, a loopback switch 13a is provided for both subsystems. The loopback switch 13a includes a switch sw1 (i.e., a first upstream switch), a switch sw2 (i.e., a second upstream switch), and a switch sw3 (i.e., a third upstream switch), which are disposed with respect to the upstream-to-downstream optical transmission subsystem.

Furthermore, the loopback switch 13a also includes a switch sw1a (i.e., a first downstream switch), a switch sw2a (i.e., a second downstream switch), and a switch sw3a (i.e., a third downstream switch), which are disposed with respect to the downstream-to-upstream optical transmission subsystem. A controller 14 is also disposed on a higher level of the apparatus. Since the configuration in FIG. 5 is fundamentally similar to that illustrated in FIG. 2, the following description will focus on FIG. 6.

The switch sw1a provided in the loopback switch 13a includes input terminals d1 and d2, as well as an output terminal d3. The switch sw2a includes an input terminal e1 and an output terminal e2. The switch sw3a includes an input terminal f1, as well as output terminals f2 and f3.

The switches sw1a to sw3a are coupled as follows. The input terminal d1 of the switch sw1a is coupled to the output terminal c3 of the switch sw3, while the input terminal d2 of the switch sw1a is coupled to the optical fiber line F2a. The output terminal d3 of the switch sw1a is coupled to the input port of the preamp 21.

The input terminal e1 of the switch sw2a is coupled to the output port of the MUX 26, while the output terminal e2 of the switch sw2a is coupled to the input port of the postamp 22. The input terminal f1 of the switch sw3a is coupled to the output port of the postamp 22, while the output terminal f2 of the switch sw3a is coupled to input terminal a2 of the switch sw1. The output terminal f3 of the switch sw3a is coupled to the optical fiber line F2b.

During loopback processing, the loopback switch 13a causes ASE to be produced from the postamp 12, amplified by the preamp 21, and then causes ASE to be output from the preamp 21 and the preamp 11 having wavelength characteristics such that the optical power is flat in the WDM optical signal wavelength band.

Alternatively, the loopback switch 13a causes ASE to be produced from the postamp 22, amplified by the preamp 11, and then causes ASE to be output from the preamp 11 and the preamp 21 having wavelength characteristics such that the optical power is flat in the WDM optical signal wavelength band.

The controller 14 provides loopback processing instruction to the loopback switch 13a. The DMUX 25 separates a received WDM optical signal into n wavelengths, and outputs the results. Each of the couplers CP4-1 to Cp4-n then splits the optical signal for one of the wavelengths into two parts, with one part being provided to one of the PDs 27-1 to 27-n, and the other part being directed to a tributary and dropped. Each of the PDs 27-1 to 27-n generates an electrical signal by O/E converting the received optical signal for one of the wavelengths, and then provides the generated electrical signal to a predetermined processor. The MUX 26 uses wavelength-division multiplexing to multiplex the optical signal provided from the preamp 21 with added optical signals, and then output the multiplexed result.

Normal downstream-to-upstream operation will now be described on the basis of FIG. 6. (Normal upstream-to-downstream operation has been described with reference to FIG. 2, and thus is herein omitted.) During normal operation, switching control is conducted as follows. The switch sw1a is switched such that the input terminal d2 is coupled to the output terminal d3, and a WDM optical signal flowing in along the optical fiber line F2a is input into the preamp 21.

The switch sw2a is switched such that the input terminal e1 is coupled to the output terminal e2, and light output from the preamp 21 is input into the postamp 22. The switch sw3a is switched such that the input terminal f1 is coupled to the output terminal f3, and light output from the postamp 22 is provided via the optical fiber line F2b. The switching control at this point is automatically set on the basis of switching instructions from the controller 14.

A WDM optical signal flowing in from downstream along the optical fiber line F2a is input into the preamp 21. The preamp 21 amplifies and outputs the WDM optical signal. The coupler Cp3 splits the amplified WDM optical signal into two parts, with one part being provided to the MUX 26, and the other part being provided to the DMUX 25.

The DMUX 25 separates the received WDM optical signal into n wavelengths, and outputs the results. Each of the couplers Cp4-1 to Cp4-n then splits the optical signal for one of the wavelengths into two parts, with one part being provided to one of the PDs 27-1 to 27-n, and the other part being directed to a tributary and dropped. Each of the PDs 27-1 to 27-n generates an electrical signal by O/E converting the received optical signal for one of the wavelengths.

The MUX 26 uses wavelength-division multiplexing to multiplex the received WDM optical signal with added optical signals, thereby generating and outputting a new WDM optical signal. The postamp 22 amplifies the WDM optical signal output from the MUX 26, and provides the result upstream via the optical fiber line F2b.

Operation during the loopback processing conducted at apparatus startup, for example, will now be described. Herein, there exist two types of loopback processing, one for the case where the ASE originates from the postamp 12, and one for the case where the ASE originates from postamp 22. The respective loopback processing for the above cases will be described separately.

Figure 7:
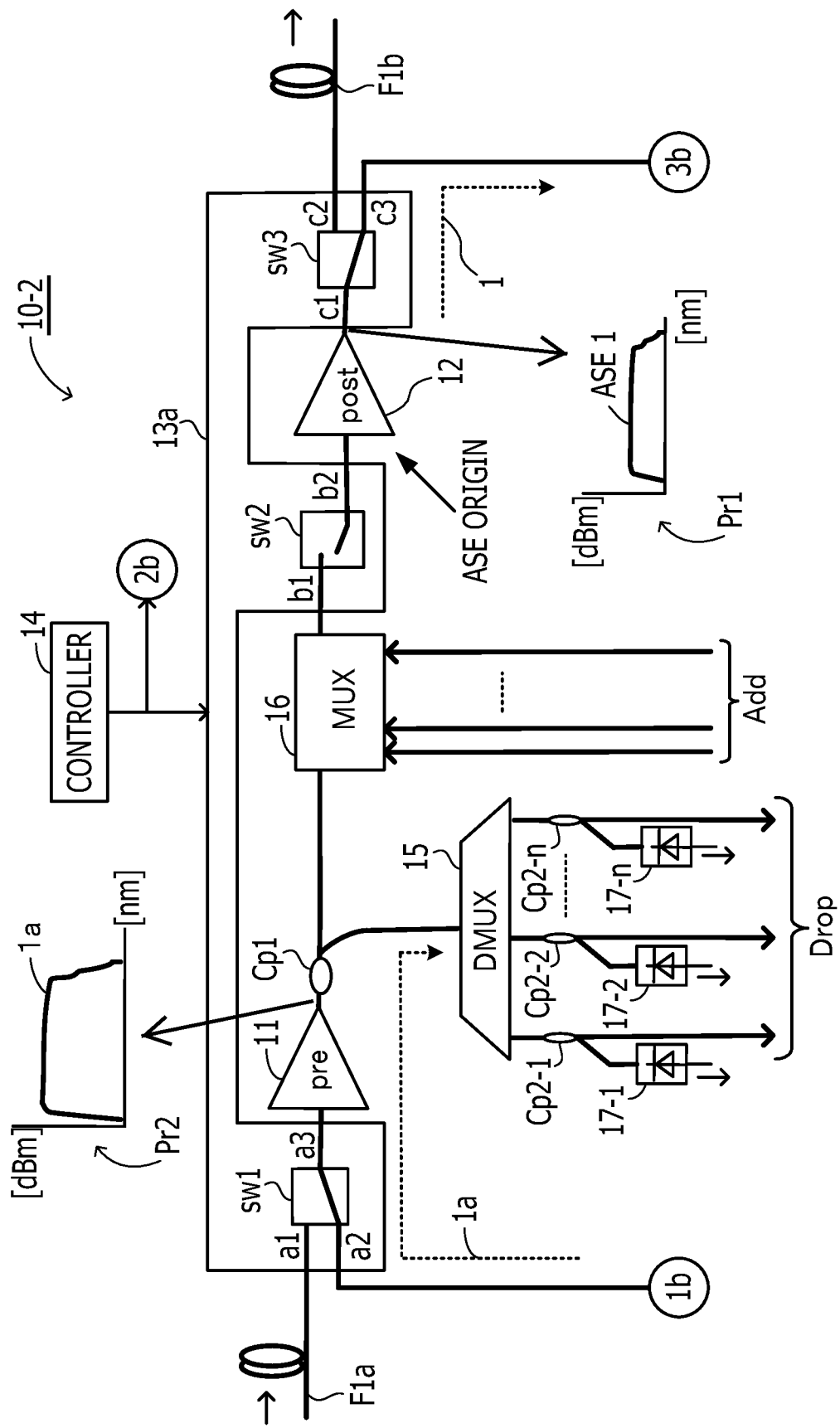
FIG. 7 illustrates an exemplary configuration of an optical transmission apparatus.
Figure 8:
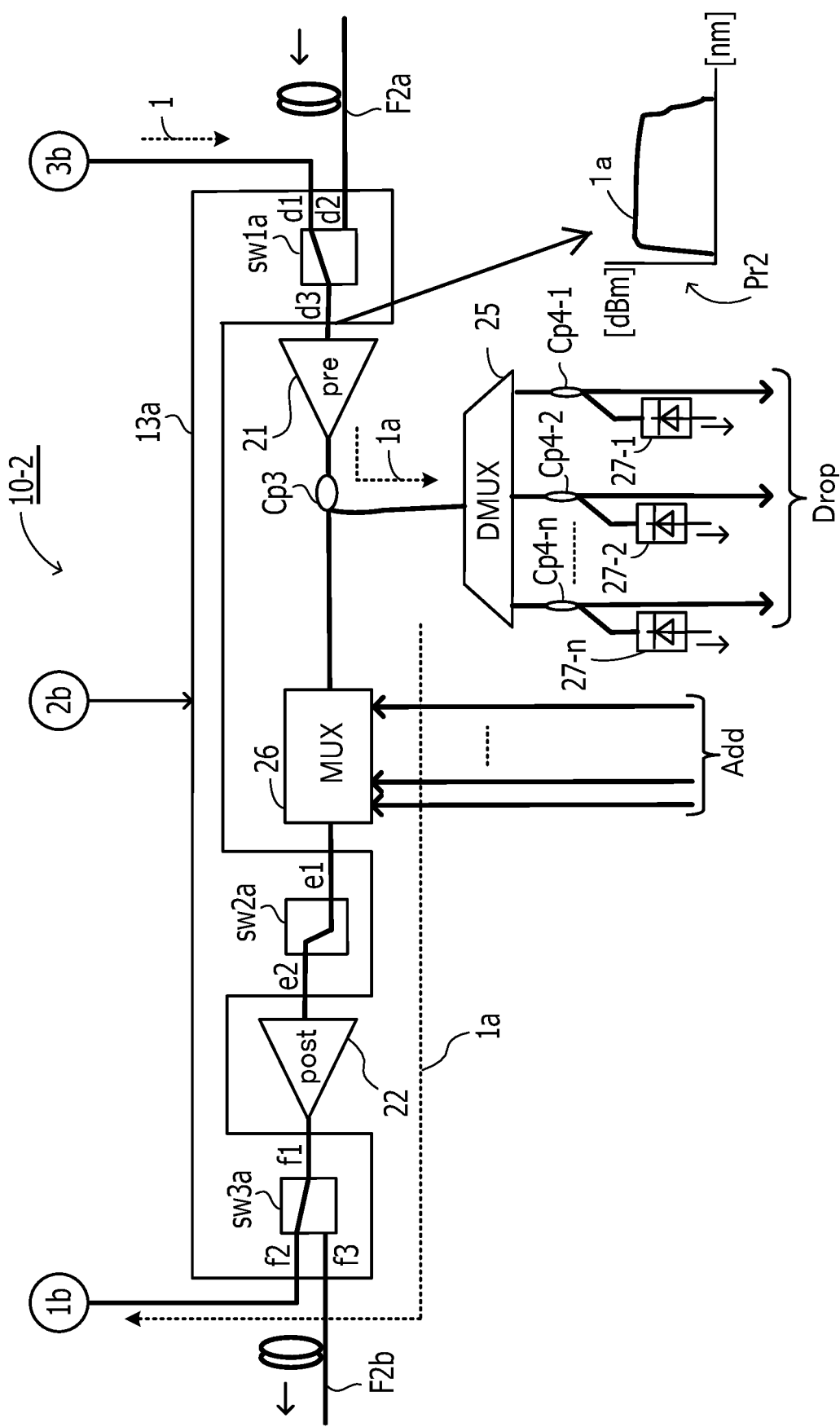
FIG. 8 illustrates an exemplary configuration of an optical transmission apparatus.

FIGS. 7 and 8 illustrate exemplary configurations of the optical transmission apparatus 10-2. FIGS. 7 and 8 illustrate the loopback state for the case where the ASE originates from the postamp 12. During loopback processing, switching control is conducted as follows. The switch sw1 is switched such that the input terminal a2 is coupled to the output terminal a3, and light output from the postamp 22 is input into the preamp 11. The switch sw2 is switched such that the input terminal b1 and the output terminal b2 are discoupled, and light output from the preamp 11 is blocked from being input into the postamp 12. The switch sw3 is switched such that the input terminal c1 is coupled to the output terminal c3, and light output from the postamp 12 is provided to the preamp 21.

The switch sw1a is switched such that the input terminal d1 is coupled to the output terminal d3, and light output from the postamp 12 is input into the preamp 21. The switch sw2a is switched such that the input terminal e1 is coupled to the output terminal e2, and light output from the preamp 21 is input into the postamp 22. The switch sw3a is switched such that the input terminal f1 is coupled to the output terminal f2, and light output from the postamp 22 is provided to the preamp 11. The switching control at this point is automatically set on the basis of switching instructions from the controller 14.

In such a switching state, the postamp 12 enters an inputless state, and produces ASE 1 in the WDM optical signal wavelength band. The ASE 1 is looped back and input into the preamp 21. The preamp 21 amplifies the ASE 1 to an optical power close to the optical power when receiving a WDM optical signal during normal operation, and then outputs the amplified ASE 1a.

The DMUX 25 separates the received ASE 1a into n wavelengths, and outputs the results. Each of the couplers Cp4-1 to Cp4-n then splits the ASE 1a for one of the wavelengths into two parts, with one part being provided to one of the PDs 27-1 to 27-n. Each of the PDs 27-1 to 27-n generates an electrical signal by O/E converting the received ASE 1a for one of the wavelengths. The optical signal levels after wavelength separation are then checked from the levels of the electrical signals output from the PDs 27-1 to 27-n (in other words, the wavelength separation function of the DMUX 25 is checked).

Herein, the ASE 1 produced by the postamp 12 has the wavelength profile Pr1, wherein the optical power is low and flat for all wavelengths in the WDM optical signal wavelength band. The ASE 1 is input into the preamp 21 and amplified to produce the ASE 1a. The ASE 1a output from the preamp 21 has the wavelength profile Pr2, wherein the optical power is high and flat for all wavelengths in the WDM optical signal wavelength band.

Meanwhile, the ASE 1a is input into the preamp 11 via the postamp 22, and then output from the preamp 11 (herein, the postamp 22 and the preamp 11 allow the ASE 1a to pass through, without performing amplification control).

The DMUX 15 separates the received ASE 1a into n wavelengths, and outputs the results. Each of the couplers Cp2-1 to Cp2-n then splits the ASE 1a for one of the wavelengths into two parts, with one part being provided to one of the PDs 17-1 to 17-n. Each of the PDs 17-1 to 17-n generates an electrical signal by O/E converting the received ASE 1a for one of the wavelengths. The optical signal levels after wavelength separation are then checked from the levels of the electrical signals output from the PDs 17-1 to 17-n (in other words, the wavelength separation function of the DMUX 15 is checked).

As described above, the ASE 1 produced herein originates from the postamp 12 disposed in the upstream-to-downstream optical transmission subsystem. Subsequently, the ASE 1 is looped back into the preamp 21 disposed in the downstream-to-upstream optical transmission subsystem, and amplified to produce the ASE 1a. The ASE 1a is then looped back into the preamp 11 disposed in the upstream-to-downstream optical transmission subsystem.

The ASE 1a has the wavelength profile Pr2, which is high and flat in the WDM optical signal wavelength band. For this reason, by utilizing such ASE 1a, it becomes possible to check the operation of individual function units in the apparatus with high precision, and improve maintenance efficiency.

For example, faults such as damage to the optical fiber between the preamp 21 and the DMUX 25 or damage to the DMUX 25 itself can be detected with good precision. In addition, faults such as damage to the optical fiber between the preamp 11 and the DMUX 15 or damage to the DMUX 15 itself can also be detected with good precision. In the foregoing, the postamp 22 and the preamp 11 are described as allowing the ASE 1a to pass through, without performing amplification control. However, the ASE 1a may be amplified in the postamp 22 or the preamp 11, as long as such amplification does not significantly impair the flatness of the wavelength profile.

Figure 9:
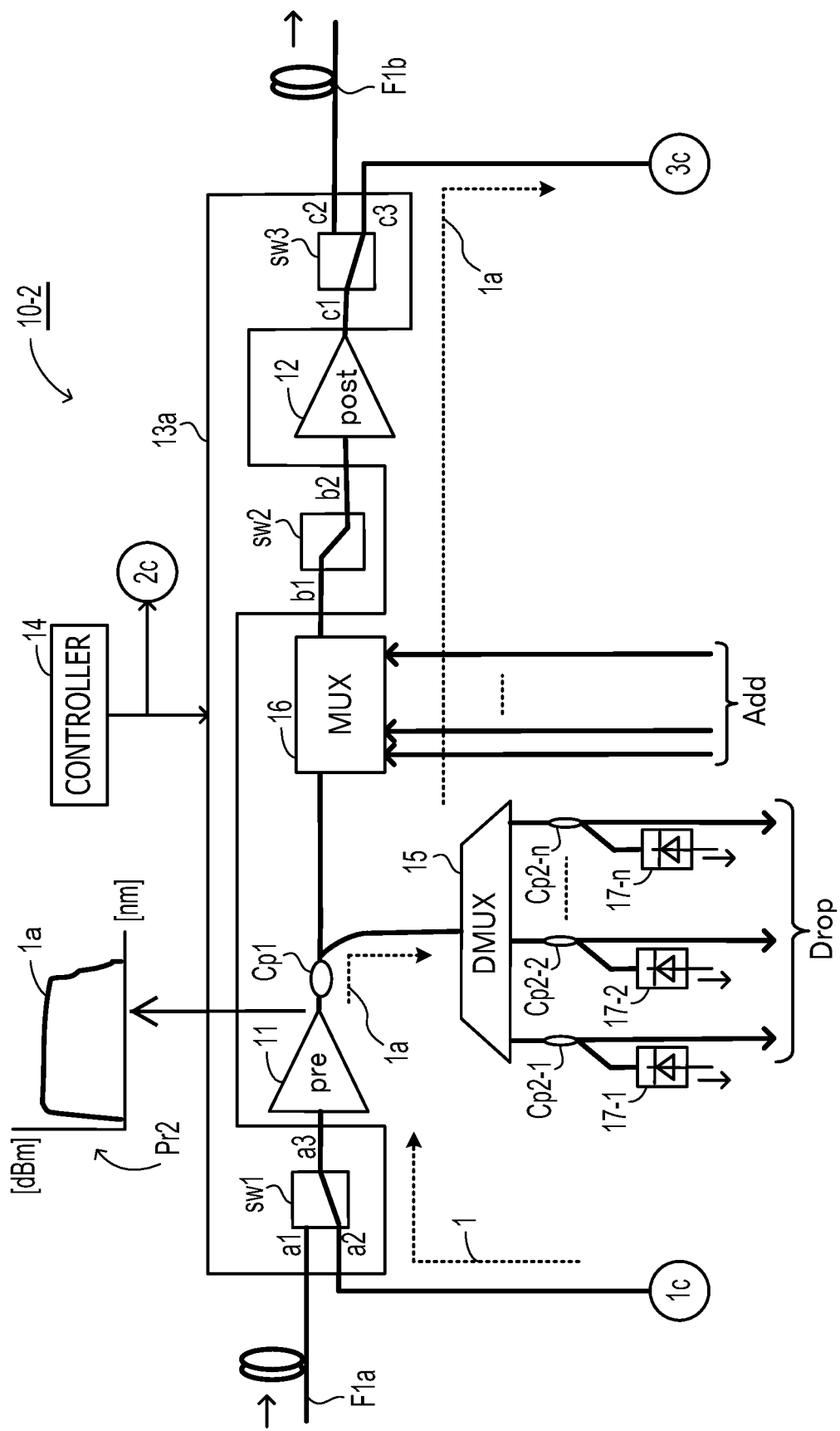
FIG. 9 illustrates an exemplary configuration of an optical transmission apparatus.
Figure 10:
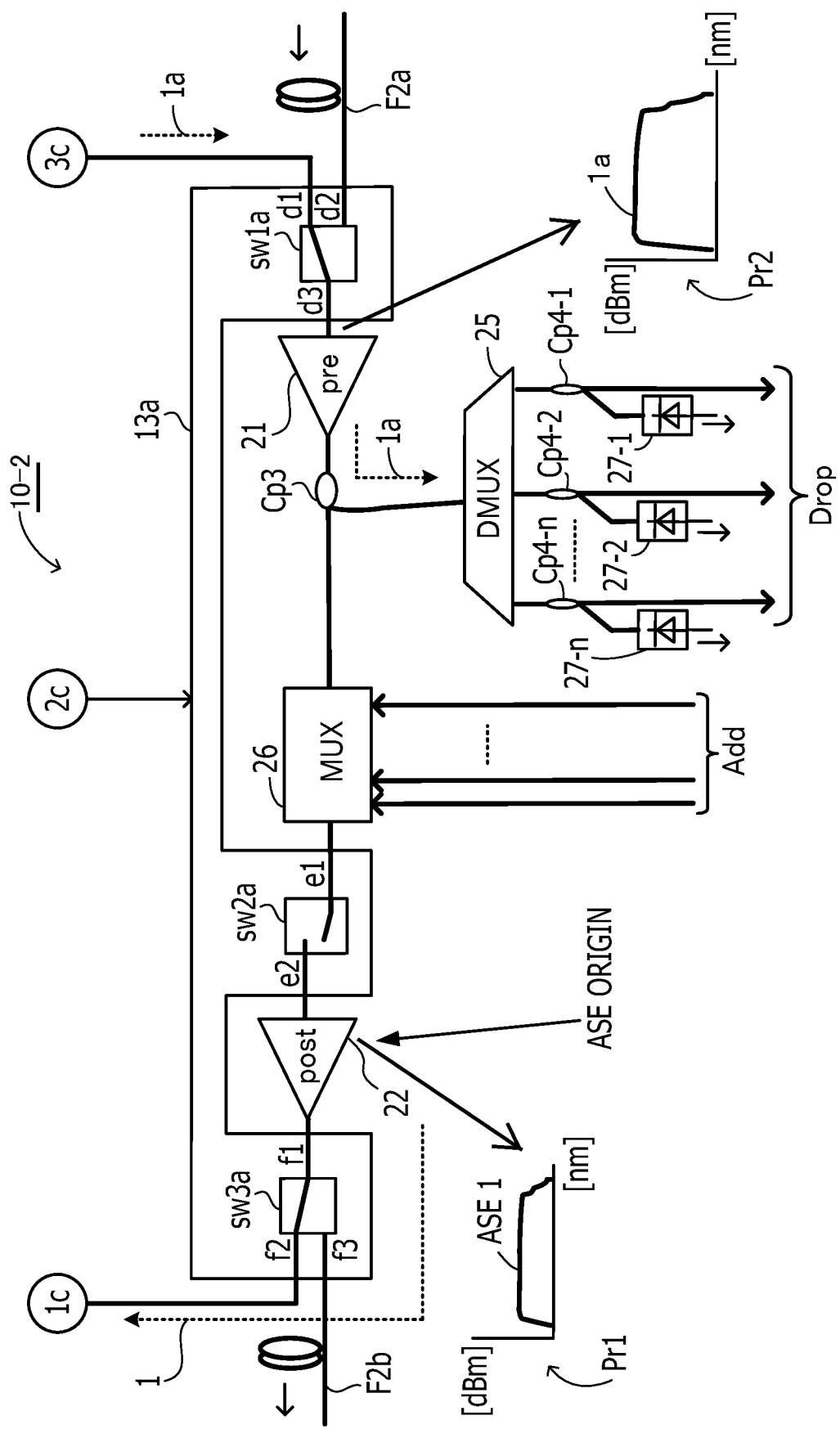
FIG. 10 illustrates an exemplary configuration of an optical transmission apparatus.
Figure 11:
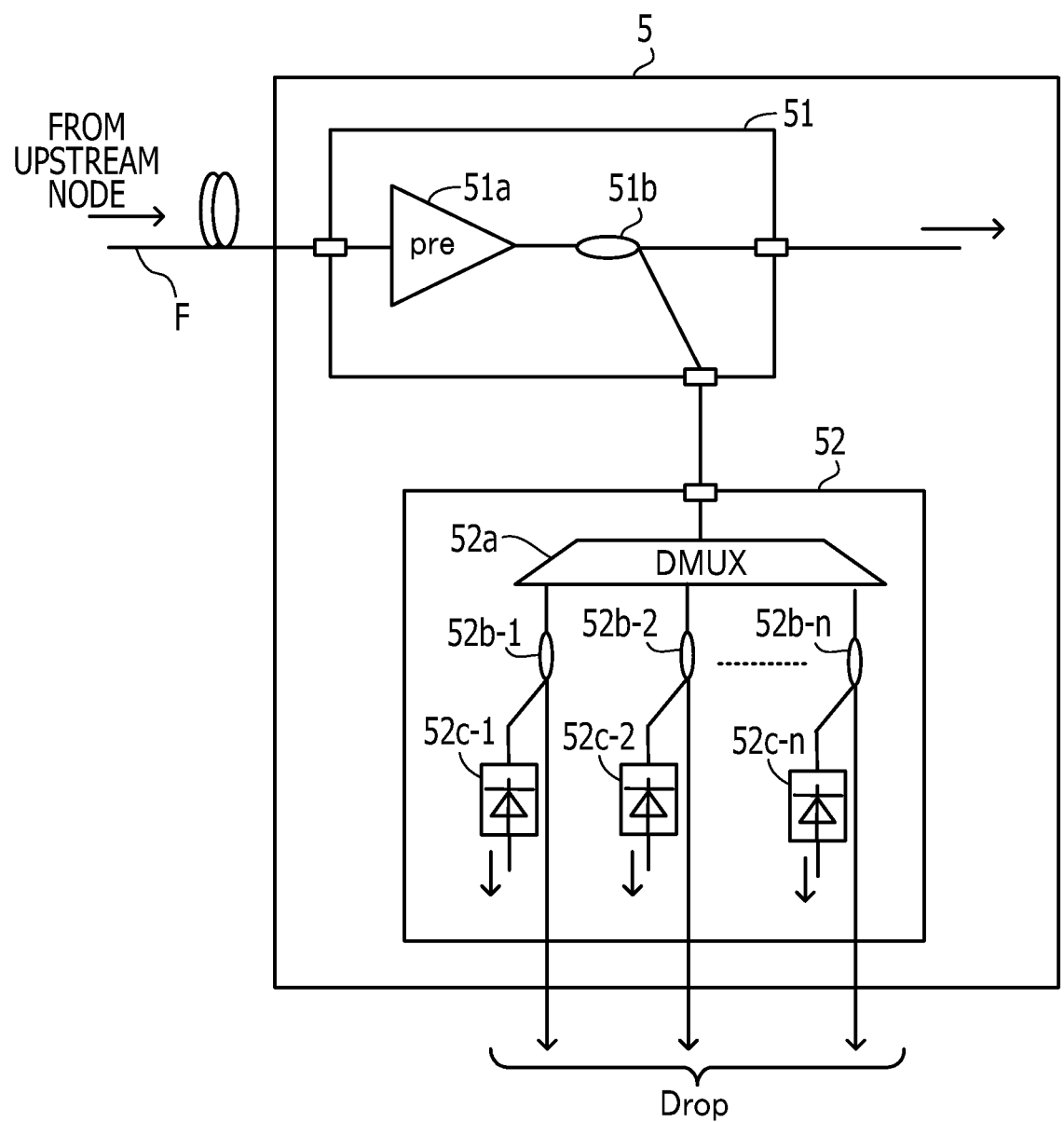
FIG. 11 illustrates a WDM transmission apparatus.

FIGS. 9 and 10 illustrate exemplary configurations of the optical transmission apparatus 10-2. FIGS. 9 and 10 illustrate the loopback state for the case where the ASE originates from the postamp 22. During loopback processing, switching control is conducted as follows. The switch sw1 is switched such that the input terminal a2 is coupled to the output terminal a3, and light output from the postamp 22 is input into the preamp 11. The switch sw2 is switched such that the input terminal b1 is coupled to the output terminal b2, and light output from the preamp 11 is input into the postamp 12. The switch sw3 is switched such that the input terminal c1 is coupled to the output terminal c3, and light output from the postamp 12 is provided to the preamp 21.

The switch sw1a is switched such that the input terminal d1 is coupled to the output terminal d3, and light output from the postamp 12 is input into the preamp 21. The switch sw2a is switched such that the input terminal e1 and the output terminal e2 are discoupled, and light output from the preamp 21 is blocked from being input into the postamp 22. The switch sw3a is switched such that the input terminal f1 is coupled to the output terminal f2, and light output from the postamp 22 is provided to the preamp 11. The switching control at this point is automatically set on the basis of switching instructions from the controller 14.

In such a switching state, the postamp 22 enters an inputless state, and produces ASE 1 in the WDM optical signal wavelength band. The ASE 1 is looped back and input into the preamp 11. The preamp 11 amplifies the ASE 1 to an optical power close to the optical power when receiving a WDM optical signal during normal operation, and then outputs the amplified ASE 1a.

The DMUX 15 separates the received ASE 1a into n wavelengths, and outputs the results. Each of the couplers Cp2-1 to Cp2-n then splits the ASE 1a for one of the wavelengths into two parts, with one part being provided to one of the PDs 17-1 to 17-n. Each of the PDs 17-1 to 17-n generates an electrical signal by O/E converting the received ASE 1a for one of the wavelengths. The optical signal levels after wavelength separation are then checked from the levels of the electrical signals output from the PDs 17-1 to 17-n (in other words, the wavelength separation function of the DMUX 15 is checked).

Herein, the ASE 1 produced by the postamp 22 has the wavelength profile Pr1, wherein the optical power is low and flat for all wavelengths in the WDM optical signal wavelength band. The ASE 1 is input into the preamp 11 and amplified to produce the ASE 1a. The ASE 1a output from the preamp 11 has the wavelength profile Pr2, wherein the optical power is high and flat for all wavelengths in the WDM optical signal wavelength band.

Meanwhile, the ASE 1a is input into the preamp 21 via the postamp 12, and then output from the preamp 21 (herein, the postamp 12 and the preamp 21 allow the ASE 1a to pass through, without performing amplification control).

The DMUX 25 separates the received ASE 1a into n wavelengths, and outputs the results. Each of the couplers Cp4-1 to Cp4-n then splits the ASE 1a for one of the wavelengths into two parts, with one part being provided to one of the PDs 27-1 to 27-n. Each of the PDs 27-1 to 27-n generates an electrical signal by O/E converting the received ASE 1a for one of the wavelengths. The optical signal levels after wavelength separation are then checked from the levels of the electrical signals output from the PDs 27-1 to 27-n (in other words, the wavelength separation function of the DMUX 25 is checked).

As described above, the ASE 1 produced herein originates from the postamp 22 disposed in the downstream-to-upstream optical transmission subsystem. Subsequently, the ASE 1 is looped back into the preamp 11 disposed in the upstream-to-downstream optical transmission subsystem, and amplified to produce the ASE 1a. The ASE 1a is then looped back into the preamp 21 disposed in the downstream-to-upstream optical transmission subsystem.

The ASE 1a has the wavelength profile Pr2, which is high and flat in the WDM optical signal wavelength band. For this reason, by utilizing such ASE 1a, it becomes possible to check the operation of individual function units in the apparatus with high precision, and improve maintenance efficiency.

For example, faults such as damage to the optical fiber between the preamp 11 and the DMUX 15 or damage to the DMUX 15 itself can be detected with good precision. In addition, faults such as damage to the optical fiber between the preamp 21 and the DMUX 25 or damage to the DMUX 25 itself can also be detected with good precision. In the foregoing, the postamp 12 and the preamp 21 are described as allowing the ASE 1a to pass through, without performing amplification control. However, the ASE 1a may be amplified in the postamp 12 or the preamp 21, as long as such amplification does not significantly impair the flatness of the wavelength profile.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment has been described in detail, it should be understood that various changes, substitutions, and alterations could be made hereto without departing from the spirit and scope of the invention.

What is claimed is:

1. An optical transmission node including an optical preamplifier to amplify input light and an optical postamplifier to amplify light output from the optical preamplifier, comprising:
the optical postamplifier configured to generate amplified spontaneous emission light without signals input;
the optical preamplifier configured to amplify the amplified spontaneous emission light from the optical postamplifier;
a loopback switch configured to discouple a path of the light output from the optical preamplifier to the optical postamplifier, and couple a path of the light output from the optical postamplifier to the optical preamplifier.

2. The optical transmission node according to claim 1, wherein the loopback switch includes:
a first switch that selects either an optical signal output from another node or the light output from the optical postamplifier, and outputs the selected light into the optical preamplifier,
a second switch that selects light output from the optical preamplifier, and either inputs the output light into the optical postamplifier or blocks the light, and
a third switch that selects light output from the optical postamplifier and provides the output light to another node or to the optical preamplifier,
and wherein
the first switch inputs light output from the optical postamplifier into the optical preamplifier,
the second switch blocks light output from the optical preamplifier from being input into the optical postamplifier, and
the third switch provides light output from the optical postamplifier to the optical preamplifier.

3. The optical transmission node according to claim 1, further comprising:
a wavelength-division demultiplexer configured such that, when a wavelength-division multiplexed optical signal is input into the optical preamplifier, the wavelength-division demultiplexer receives and demultiplexes the wavelength-division multiplexed optical signal that has been amplified by the optical preamplifier, wherein
when checking the operation of the wavelength-division demultiplexer, the loopback switch causes amplified spontaneous emission output from the optical preamplifier to be input into the wavelength-division demultiplexer by switching.

4. An optical transmission node, comprising:
an upstream optical preamplifier including optical amplification functions, and disposed in a subsystem that conducts upstream-to-downstream optical transmission;
an upstream optical postamplifier including optical amplification functions, and disposed downstream to the upstream optical preamplifier;
a downstream optical preamplifier including optical amplification functions, and disposed in a subsystem that conducts downstream-to-upstream optical transmission;
a downstream optical postamplifier including optical amplification functions, and disposed downstream to the downstream optical preamplifier; and
a loopback switch configured to conduct loopback processing, wherein light output from the upstream optical postamplifier is looped back and input into the downstream optical preamplifier, and light output from the downstream optical postamplifier is looped back and input into the upstream optical preamplifier.

5. The optical transmission node according to claim 4, wherein the loopback switch includes:
a first upstream switch that selects either an optical signal provided from upstream or light output from the downstream optical postamplifier, and inputs the selection into the upstream optical preamplifier,
a second upstream switch that selects light output from the upstream optical preamplifier and either inputs the output light into the upstream optical postamplifier or blocks the light,
a third upstream switch that selects light output from the upstream optical postamplifier and provides the output light downstream or to the downstream optical preamplifier,
a first downstream switch that selects either an optical signal provided from downstream, or light output from the upstream optical postamplifier, and inputs the selection into the downstream optical preamplifier,
a second downstream switch that selects light output from the downstream optical preamplifier, and either inputs the output light into the downstream optical postamplifier or blocks the light, and
a third downstream switch that selects light output from the downstream optical postamplifier, and provides the output light upstream or to the upstream optical preamplifier.

6. The optical transmission node according to claim 5, wherein, during loopback processing when amplified spontaneous emission originates from the upstream optical postamplifier,
the first upstream switch inputs light output from the downstream optical postamplifier into the upstream optical preamplifier,
the second upstream switch blocks light output from the upstream optical preamplifier from being input into the upstream optical postamplifier,
the third upstream switch provides light output from the upstream optical postamplifier to the downstream optical preamplifier,
the first downstream switch inputs light output from the upstream optical postamplifier into the downstream optical preamplifier,
the second downstream switch inputs light output from the downstream optical preamplifier into the downstream optical postamplifier, and
the third downstream switch provides light output from the downstream optical postamplifier to the upstream optical preamplifier.

7. The optical transmission node according to claim 5, wherein, during loopback processing when amplified spontaneous emission originates from the downstream optical postamplifier,
the first upstream switch inputs light output from the downstream optical postamplifier into the upstream optical preamplifier,
the second upstream switch inputs light output from the upstream optical preamplifier into the upstream optical postamplifier,
the third upstream switch provides light output from the upstream optical postamplifier to the downstream optical preamplifier,
the first downstream switch inputs light output from the upstream optical postamplifier into the downstream optical preamplifier, the second downstream switch blocks light output from the downstream optical preamplifier from being input into the downstream optical postamplifier, and the third downstream switch provides light output from the downstream optical postamplifier to the upstream optical preamplifier.

8. The optical transmission node according to claim 4, further comprising:

an upstream wavelength-division demultiplexer configured such that, when a wavelength-division multiplexed optical signal provided from upstream is input into the upstream optical preamplifier, the upstream wavelength-division demultiplexer receives and demultiplexes the upstream wavelength-division multiplexed optical signal that has been amplified by the upstream optical preamplifier; and a downstream wavelength-division demultiplexer configured such that, when a wavelength-division multiplexed optical signal provided from downstream is input into the downstream optical preamplifier, the downstream wavelength-division demultiplexer receives and demultiplexes the downstream wavelength-division multiplexed optical signal that has been amplified by the downstream optical preamplifier, wherein when checking the operation of the upstream wavelength-division demultiplexer and the downstream wavelength-division demultiplexer, the loopback switch uses loopback processing to cause amplified spontaneous emission output from the upstream optical preamplifier to be input into the upstream wavelength-division demultiplexer, and to cause amplified spontaneous emission output from the downstream optical preamplifier to be input into the downstream wavelength-division demultiplexer.

9. An optical signal level checking method executed in an optical transmission node provided with a transmission line that transmits optical signals, optical preamplifier that amplifies an input optical signal, and optical postamplifier that amplifies light output from the optical preamplifier, the method comprising:

executing loopback processing, wherein output light output by the optical postamplifier is looped back and input into the optical preamplifier;

blocking light output from the optical preamplifier from being input into the optical postamplifier;

producing amplified spontaneous emission from the optical postamplifier;

inputting the amplified spontaneous emission into the optical preamplifier and amplifying the amplified spontaneous emission;

separating the wavelengths of the amplified spontaneous emission output from the optical preamplifier; and checking the optical signal level by receiving the wavelength-separated amplified spontaneous emission.

\* \* \* \* \*